Patented Aug. 4, 1931

1,817,227

UNITED STATES PATENT OFFICE

ROBERT M. BIRD, OF UNIVERSITY, VIRGINIA, ASSIGNOR, BY MESNE ASSIGNMENTS, TO NATIONAL COLD STEAM COMPANY, OF CHARLOTTESVILLE, VIRGINIA, A CORPORATION OF DELAWARE

SPRAY MATERIAL AND METHOD OF APPLICATION

No Drawing.  Application filed January 8, 1925.  Serial No. 1,288.

The present invention or discovery relates to spraying mixtures and particularly to mixtures for spraying vegetation for ridding it of pests or germs detrimental to the growth or development thereof, and one object of the invention is to provide a method of making a spraying mixture for plants having toxic materials therein normally liable to injure the plants, the harmful effects of which materials are reduced by my method practically to a minimum without substantially reducing the toxic characteristics of the materials.

Another object of the invention is to provide a method of making a spraying mixture of insecticidal, fungicidal and other forms of spray materials to be used upon the plants, whereby any burning or like harmful effects upon the plants normal to such materials are reduced by my method practically to a minimum without substantially reducing the toxic characteristics of the materials.

Another object is to provide a method of making a spraying mixture the chief toxic ingredient of which is an arsenic material, or other toxic material, containing over three-fourths of one percent water soluble arsenic ingredient and which may be used without injury to the plants, a mixture containing arsenic material, or other toxic material, containing over three-fourths of one percent water soluble arsenic ingredient being at present advised against and not approved by the authorities because of its injurious effects upon plants, but by my method becoming non-injurious to the plants.

Another object of the invention is to provide a method of making a spraying mixture having therein toxic material in solution, in suspension, or in colloidal suspension, in water or other suitable solvent or suspending medium—each having more or less well known properties—mixed with a substance which absorbs the toxic material and which neutralizes more or less any naturally injurious effects thereof on plants, such injurious effects being thought to be due to the action of water on the toxic material, and having mixed therewith an oil or wax, or both, of mineral, vegetable or animal origin, which itself is not in anywise injurious to the plants but which mixes with the waxy material on the surfaces of the plant leaves, etc., and forms a layer thereon which prevents the toxic material from soaking into or being adsorbed in the plant surface in a manner and to a degree which injures such surface.

A feature of the invention is the use of a plant foliage and fruit protectant which consists of a natural wax or oil, or both, possessing the following characteristics:

1. Soluble in and with the natural waxy or oily substance of leaves and fruit.

2. Protects the foliage and fruit from the natural caustic or "burning" effects produced by many insecticides, fungicides, scalecides, bactericides which are used to combat plant enemies, when such insecticides etc. are applied alone, or along with water or other liquid or solid dilutant. The solution of natural plant-wax and protectant prevents an absorption by the leaf or fruit surface of the caustic or otherwise deleterious substance.

This plant foliage and fruit protectant consists of:

Paraffin wax or paraffin oil or petroleum grease or other mineral oil product of similar neutral and non-toxic character.

Beeswax or other similar substance of insect or animal origin.

Plant or animal fats or oils of neutral and non-toxic character.

The above substances may be used alone or in a mixture of two or more.

Such protectant is incorporated mechanically with liquid or solid insecticide etc. and does not react chemically with such. This mixing or incorporating process must be carried out by the manufacturer of any given insecticide, etc. The quantity of protectant which must be added to any given insecticide etc. varies, of course, with the amount of damage to the plant which would be caused by the insecticide used alone.

The economic value of the application of this discovery lies in the fact that many cheap and effective insecticides etc. cannot be used alone to combat plant enemies, because of the damage they do to the plant; but when this plant foliage and fruit protectant is incorporated with the insecticide, etc. it can be used effectively without damage to the plant.

One method of preparing a spray material having the above characteristics consists in precipitating arsenious oxide in the presence of a basic hydrated oxide (such as aluminum hydroxide or other colloidal substance of similar general chemical and physical characteristics) which basic, colloidal substance adsorbs the compounds of arsenic present but does not form stable chemical compounds with the arsenious oxide. The resulting mixture of colloidal or colloid-like properties is mixed with one or more of the following plant protecting oily or waxy substances: paraffin wax, paraffin oil, vaseline, or other wax or oil of mineral or vegetable or animal origin which is itself not injurious to the plant, and with a substance which permits such mixture of toxic material, the adsorbant and oily or waxy protectant to remain for a suitable and practical length of time in a colloidal or colloid-like suspension in water or oil after an emulsion has been formed by any of the known methods of creating an emulsion which may be applied to the plant surfaces in an economical and effective manner by any methods of spraying such materials onto the plants.

Another method of preparing one of my spray mixtures consists in mixing carbolic acid (phenol) and camphor with an oil or wax—of mineral, vegetable or animal origin—which oil or wax does not itself injure the plant—and any of the well known substances (for example soap) which yield a water emulsion.

Another method of preparing my spray mixture consists in precipitating arsenious oxide in the presence of hydrated copper oxide yielding the toxic equivalent of Paris green, and mixing with oil or wax—of mineral, vegetable or animal origin—which oil or wax does not itself injure the plant—and any of the well known substances (for example soap) which yield a water emulsion.

Another method of preparting my spray mixture consists in mixing calcium sulpharsenite with oil or wax—of mineral, vegetable or animal origin—which oil or wax does not itself injure the plant—and any of the well known substances (for example soap) which yield a water emulsion.

Another method of preparing my spray mixture consists in mixing calcium arsenate containing in relatively concentrated suspension with oil or wax—of mineral, vegetable or animal origin—which oil or wax does not itself injure the plant.

I will now give, by way of example, exact formulas for preparing some of the above spray materials. As shown by Formula 1, I first make two mixtures which are then emulsified together.

Formula 1

Mixture A:
Colloidal arsenious oxide containing 354 grams As.
Colloidal aluminum hydroxide containing 341 grams Al(OH)$_3$.
Dilute with water to 2840 cc.
Mixture B:
454 grams common laundry soap dissolved in 5676 cc. of water, and cooled.
2835 cc. oil, made of 1875 cc. paraffin oil, 710 cc. kerosene oil, 125 cc. petrolatum, 125 cc. paraffin (melted).
Emulsify the above ingredients of mixture B in a standard machine to form a soap-oil emulsion.
Mixtures A and B are then emulsified together to form a concentrate.
The above quantity of concentrate is diluted with water to 150 gallons for application as a spray to aphis and other eating insect pests.

Formula No. 2

Instead of the quantity of arsenious oxide of Formula No. 1, I may substitute 3 pounds of commercial calcium arsenate.

Formula No. 3

Instead of said quantity of arsenious oxide I may substitute 4.7 pounds of commercial lead arsenate.
The materials of No. 2 and No. 3 are best in colloidal form or finest powder.

Formula No. 4

Instead of said quantity of arsenious oxide, I may substitute chemical equivalents of the thioarsenites or thioarsenates (also called sulphursenites or sulphursenates), 3 to 5 pounds.

Formula No. 5

A solution of 1 pound of carbolic acid in 1 pound of camphor may be added to any of the above formulas, to be used for both bactericidal and insecticidal purposes.

The toxic value of Formula No. 1 is much greater than the formulas of the other arsenate compounds. It kills insects and, when in the dilution recommended, does not injure even so delicate plants as primroses.

The aluminum hydroxide absorbs the arsenic compounds; and the soap-oil emulsion also protects the plants besides having some insecticidal value of its own.

The important feature of the invention is the adding of a chemically basic colloid which both adsorbs and chemically neutralize the acidic insecticidal materials which dissolve in water (the form in which they are absorbed by the plant and injure the foliage).

The paraffin oils—paraffin, paraffin oil and petroleum—adhere in a microscopic film on the upper surface of the leaves, and on the hair-like under part of the leaves. This materially aids in the protection from absorption of dissolved toxic or other injurious constituent of the spray material.

I have found by experimental tests that many materials, ordinarily of the most injurious, are rendered non-injurious when applied as a mixture with the adsorbent colloidal basic aluminum hydroxide, or oxides, and the inoccuous paraffin oils.

Having thus described my invention or discovery it should be understood that there may be modifications thereof and variations therein without departing from the spirit or scope of the invention as claimed.

What I claim and desire to protect by Letters Patent is:

1. A composition of matter for insecticidal use on plants resulting from a mixture of a toxic substance containing arsenious oxide, a colloidal basic hydrated oxide, and an oily substance, non-toxic to plants, which latter substance is further adapted to protect said plant from the burning effects of said toxic substance.

2. An insecticide for plants resulting from a mixture of a toxic arsenical substance containing arsenious oxide yielding the toxic equivalent of Paris green, a colloidal basic hydroxide, and a substance non-toxic to plants adapted to protect said plants from the burning effects of said toxic substance.

3. A method of preparing spray material, said method comprising mixing an acidic arsenious substance and a chemically basic colloid with water, whereby the acidic arsenious substance is adsorbed and chemically neutralized; and then adding and mixing therewith soap paraffin oil and paraffin wax.

4. A method of preparing spray material, said method comprising precipitating a compound of arsenious oxide with a basic substance in the presence of colloidal aluminum hydroxide to form a mixture; emulsifying a water solution of soap with paraffin oil and paraffin wax from a soap-oil emulsion; and emulsifying said mixture and emulsion together.

5. A method of preparing spray material, said method comprising precipitating arsenious oxide in the presence of colloidal aluminum hydroxide, whereby the arsenious oxide is adsorbed and chemically neutralized and precipitated to form a mixture; emulsifying a water solution of soap with paraffin oil and melted paraffin wax to form a soap oil emulsion; and emulsifying said mixture and emulsion together and diluting.

6. A method of preparing spray material, said method comprising mixing colloidal arsenious oxide and colloidal aluminum hydroxide with water, whereby the arsenious oxide is neutralized and precipitated to form a mixture; emulsifying a water solution of soap with a mixture of oils including paraffin oil, kerosene, petrolatum and melted paraffin wax to form a soap oil emulsion; emulsifying said mixture and emulsion together to form a concentrate; and diluting the concentrate with water.

7. A spray material comprising a toxic arsenical substance emulsified with a solution including paraffin.

8. A spray material comprising a mixture of a neutral arsenious precipitated soap, and paraffin.

9. A spray material comprising an emulsion of a neutralized arsenious substance, a water solution of soap, paraffin oil, and paraffin wax.

Signed at Charlottesville, in the county of Albemarle and State of Virginia, this 5th day of January, A. D. 1925.

ROBERT M. BIRD.